Patented Mar. 31, 1931

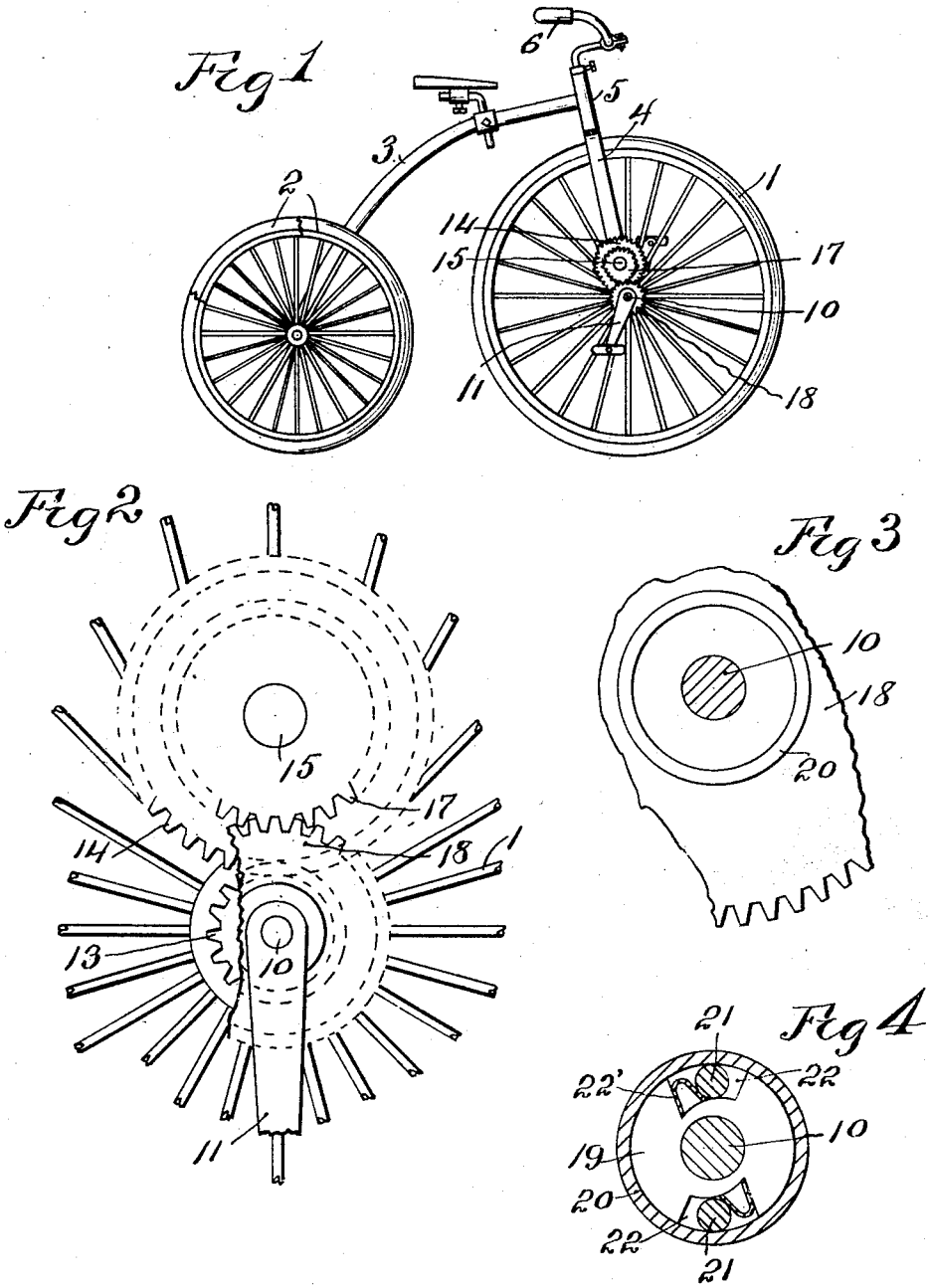

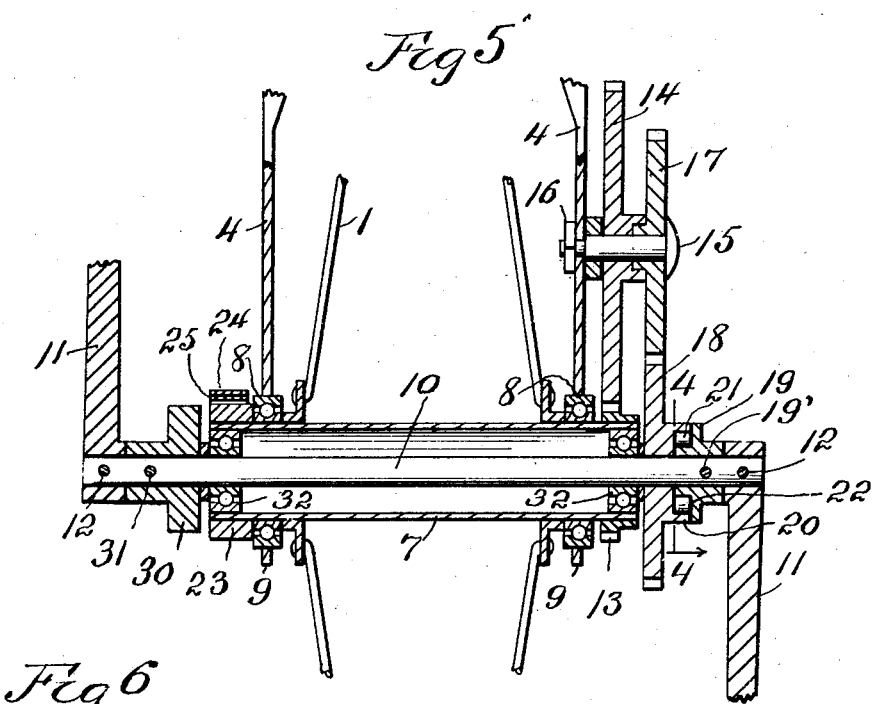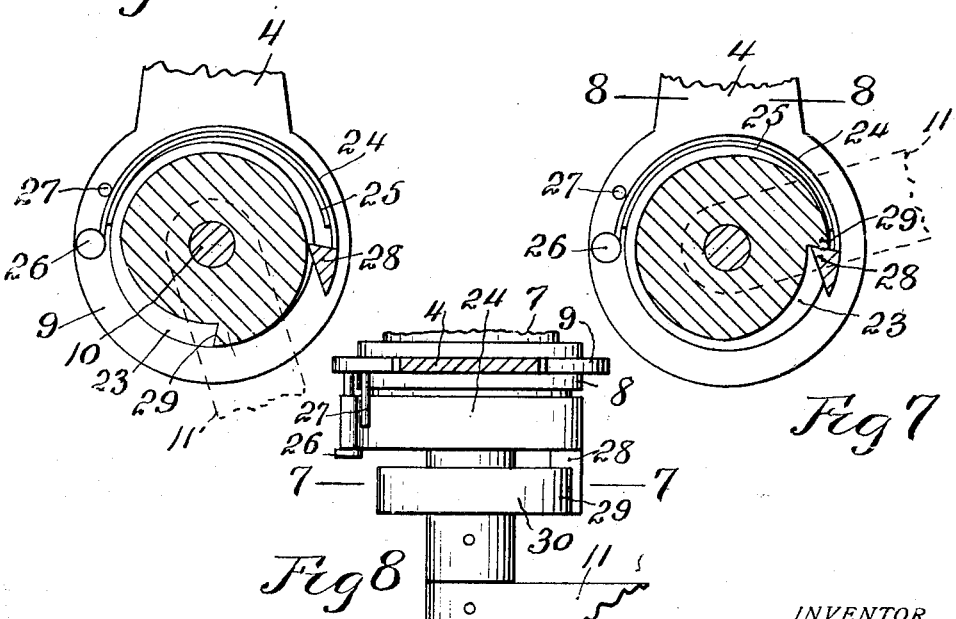

1,798,383

UNITED STATES PATENT OFFICE

GARFIELD A. ROBERDS, OF OLATHE, KANSAS, ASSIGNOR OF ONE-HALF TO JOSEPH FELDMAN, OF OLATHE, KANSAS

CYCLE DRIVING MECHANISM

Application filed May 29, 1930. Serial No. 456,913.

My invention relates to improvements in cycle driving mechanisms adapted for use in connection with unicycles, bicycles, tricycles and motor cycles.

One of the objects of my invention is to provide a novel driving mechanism of the kind described, which is simple, cheap, strong, durable, not likely to get out of order, which operates easily and efficiently, and which is applicable to cycles of types in general use.

A further object of my invention is to provide a novel driving mechanism which effects a multiplication in speed of the driving carrying wheel, while dispensing with the usual chain or rod drive, and with the elimination of the usual shaft bearing on the frame of a bicycle between the front and rear wheels.

A further object of my invention is the provision of novel clutch mechanism in the driving gearing, which permits coasting.

Still another object of my invention is the provision of a novel braking mechanism.

This application is a continuation, in part, of an application filed by me May 19, 1930, having Serial Number 453,670.

The novel features of my invention are hereinafter fully described and claimed.

In the accompanying drawings, which illustrate the preferred embodiment of my invention, Fig. 1 is a reduced side elevation, partly broken away, showing my improved driving mechanism as applied to a tricycle of usual type.

Fig. 2 is an enlarged side elevation, partly broken away, of part of the driving mechanism.

Fig. 3 is an outside elevation, enlarged and partly broken away, of the gear clutch member.

Fig. 4 is an enlarged section on the line 4—4 of Fig. 5.

Fig. 5 is an enlarged central longitudinal section through the hub of the driving carrying wheel, and parts connected therewith.

Fig. 6 is an enlarged section on the plane of 7—7 of Fig. 8, showing the brake in inactive position.

Fig. 7 is a section on the line 7—7 of Fig. 8, showing the brake in the active position.

Fig. 8 is a section on the line 8—8 of Fig. 7.

Similar characters of reference designate similar parts in the different views.

1 designates the driving carrying wheel, which may be the driving carrying wheel of a unicycle, bicycle, tricycle or motorcycle. In the drawing it is shown as the front wheel of a tricycle, the rear wheels 2 supporting in the usual manner the rear end of the frame 3, the front end of which is provided with the usual front fork 4 revoluble in the usual steering post 5 and having the usual handle bars 6.

The wheel 1 has a tubular hub 7 having on its periphery two sets of ball bearings 8, the outer ball races of which are respectively firmly fastened in enlargements 9 provided respectively at the lower ends of the arms of the fork 4.

For driving the wheel 1, there is extended axially, preferably through the hub 7, a rotary driving shaft 10, the axis of which, as shown, is the axis of the hub 7.

Pedal levers or cranks 11 are removably fastened by removable pins 12 to the shaft 10.

Multiplying driving gearing operatively connects the shaft 10 with the hub 7, whereby the wheel 1 is rotated at a speed greater than the shaft 10.

The multiplying gearing in the embodiment shown comprises the following described parts.

Fastened rigidly to or integral with the hub 7 at one end thereof is a spur gear 13, Fig. 5, which meshes with an intermediate spur gear 14 of larger diameter rotatably mounted on an outwardly extending horizontal shouldered bolt 15, which extends through the adjacent arm of the fork 4 to which it is securely clamped by a nut 16. The larger diameter of the gear 14 effects an increase of speed in the wheel 1 by means of the smaller gear 13.

Also rotatable on the bolt 15 and rigidly secured to the gear 14 is a spur gear 17 which meshes with a spur gear 18 of like diameter, and which is rotatable on the shaft 10.

The spur gear 18 forms one member of a clutch, the other member, 19, of which is rigidly removably secured by a removable pin 19' on the shaft 10 at the outer side of the gear 18. The latter is provided with an annular outwardly extending flange 20 against which are adapted to engage and lock therewith two diametrically opposite rollers 21, respectively disposed in opposite arcuate recesses 22 in the periphery of the clutch member 19, which recesses 22, as shown in Fig. 4, taper to the right, circumferentially, with the bottoms of the recesses disposed so that, when the clutch member 19 is rotated clock-wise, as viewed in Fig. 4, the rollers 21 will be respectively crowded into the smaller end portions of the recesses 22, thereby locking together the clutch members 19 and 18, whereby forward driving of the pedal levers 11 will forwardly revolve the wheel 1 at a faster speed than the shaft 10, through the intermediacy of the clutch members 19 and 18, rollers 21, and gears 17, 14 and 13.

Two springs 22', which may be of any desired type, and which are shown in the drawing, Fig. 4, as U shaped, are respectively disposed in the recesses 22 and respectively bear against the rollers 21 for normally forcing the latter to positions in which they will bear against the bottoms of the recesses 22 and against the annular flange 20. However, the springs 22' may be dispensed with, if desired, but certainty of action is assured with their use.

In coasting the pedal levers 11 are held from turning, whereupon continued revolving of the wheel 1 and clutch member or gear 18 forwardly, will cause the rollers 21 to be turned so as to move toward the larger portions of the recesses 22, thereby releasing the locking engagement which has been existing between the clutch members 18 and 19. As soon as forward turning of the shaft 10 is resumed, the rollers 21 will again lock together the clutch members 18 and 19, for the forward driving of the wheel 1.

For braking the wheel 1, the hub 7 has an enlarged portion 23, constituting a brake drum, Figs. 5 to 8, the periphery of which is adapted to be tightly embraced by an arcuate brake strap 24, having the usual lining 25, and one end of which is pivoted to a post 26 mounted in the adjacent enlargement 9 of the fork 4. A pin 27 in said enlargement 9, at the outer side of the strap 24 limits the movement of the latter from the brake drum 23. The other end of the brake strap 24 has an under cut lip 28 adapted to engage a similar lip or tooth 29 on the periphery of a collar 30 removably fastened by a removable pin 31 on the shaft 10, between the hub 7 and the left pedal 11.

When the cycle is being driven forwardly the lip or tooth 29 will pass the lip 28 of the brake strap, but upon pressing downwardly on the left pedal lever 11, when in the position of the latter, shown in dotted lines in Fig. 7, the lip or tooth 29 will engage the lip 28 of the brake strap 24 and the latter will be forced to tightly embrace the brake drum 23, with a degree of pressure, such as is exerted by the left foot on the left pedal lever 11.

Revolubly supporting the shaft 10 in the hub 7 are two bearings 32, preferably of the ball or roller type, respectively mounted in opposite ends of the hub 7, Fig. 5.

Excepting for the improvements hereinbefore described, the cycle may be of the usual construction, the improvements being applicable to the driving wheels of unicycles, bicycles, tricycles and motorcycles.

The cycle is operated for driving, coasting or braking in the usual manner.

I do not limit my invention to the structure shown and described, as many modifications, within the scope of the appended claims, may be made, without departing from the spirit of my invention.

What I claim is:—

1. In a cycle pedal operated driving mechanism, a rotary driving crank shaft, a carrying wheel within the perimeter of which said crank shaft is located, and driving gearing connecting said shaft and said wheel and including two clutch members one rotatable with and the other rotatable on and relatively to said shaft, and a locking roller carried by one of said clutch members, and movable, when said shaft is forwardly rotated, into locking engagement with both said clutch members, and releasable from such locking engagement when said shaft is held from rotating while said wheel is forwardly revolving.

2. In a cycle driving mechanism, a cycle wheel driving shaft, a carrying wheel having a hub through which said shaft extends, two clutch members rotatable one with and the other relatively to said shaft, one member being a gear wheel, a locking roller carried by one of said clutch members and movable, when said shaft is forwardly rotated, into locking engagement with both of said clutch members, and releasable from such engagement when said shaft is held from turning while said carrying wheel is forwardly revolving, and gearing operatively connecting said gear wheel clutch member with said hub for rotating the latter.

3. In a cycle driving mechanism, a cycle carrying wheel, a carrying wheel driving member, two clutch members rotatable one with and the other relatively to said member, one clutch member being a gear wheel having an annular flange concentric with its axis, the other clutch member having a recess in its periphery said periphery being encircled by said flange, a roller in said recess movable, when said driving member is rotated forwardly into locking engagement with said flange and the recessed clutch member and releasable from such engagement when said driving member is held from turning while said carrying wheel is forwardly revolving, and gearing operatively connecting said gear wheel clutch member with said carrying wheel for driving the latter.

4. In a cycle driving mechanism, a cycle carrying wheel, having pedal operated driving shaft within the perimeter of said wheel, a clutch engaging and operable by said shaft, and multiplying gearing connecting said clutch and said wheel for revolving the latter, said clutch being effective for actuating said gearing when said shaft is forwardly rotated and inoperative for driving said gearing when said shaft is held from turning and said wheel is revolving forwardly.

5. In a cycle driving mechanism, a steering fork, a carrying wheel rotatable between the arms of said fork and having a tubular hub, a driving shaft extending through and rotatably supported in said hub, bearing means supporting the arms of said fork on said hub independently of said shaft, and multiplying gearing connecting said driving shaft and said wheel.

6. In a cycle driving mechanism, a steering fork, a carrying wheel rotatable between the arms of said fork and having a tubular hub, a driving shaft extending through and revoluble in said hub, two sets of ball bearings respectively mounted on said arms and mounted on said hub, two sets of ball bearings mounted in said hub and on said shaft and supporting the latter, and multiplying gearing connecting said shaft and said wheel.

In testimony whereof I have signed my name to this specification.

GARFIELD A. ROBERDS.